United States Patent [19]

Hall

[11] Patent Number: 4,679,345
[45] Date of Patent: Jul. 14, 1987

[54] FISHING LINE STRIKE INDICATOR

[76] Inventor: Dwayne A. Hall, 918 Cherry Dr., Schaumburg, Ill. 60194

[21] Appl. No.: 852,747

[22] Filed: Apr. 16, 1986

[51] Int. Cl.⁴ ............................................. A01K 97/12
[52] U.S. Cl. ............................................ 43/17; 43/16
[58] Field of Search .................................... 43/16, 17

[56] References Cited

U.S. PATENT DOCUMENTS

| | | | |
|---|---|---|---|
| 2,775,053 | 12/1956 | Knoll | 43/17 |
| 2,869,275 | 1/1959 | Levin | 43/17 |
| 3,221,705 | 12/1965 | Saviskas | 43/17 |
| 3,599,368 | 8/1971 | Riley | 43/17 |
| 4,573,281 | 3/1986 | Moisan | 43/17 |

Primary Examiner—Nicholas P. Godici
Assistant Examiner—Kurt Rowan
Attorney, Agent, or Firm—Lester N. Arnold

[57] ABSTRACT

An improved fishing line strike indicator device includes a pair of biased clamping members to clamp the strike indicator device to the diameter of a fishing pole, a pivotable spring-biased signalling arm is set against restraint in a horizontal position, and is partially looped by a slightly restrained fishing line in a manner effective to release the arm from its restraint with forward movement of the fishing line. The released signalling arm springs to a vertical position indicative of forward line movement associated with the striking action of a feeding fish.

5 Claims, 4 Drawing Figures

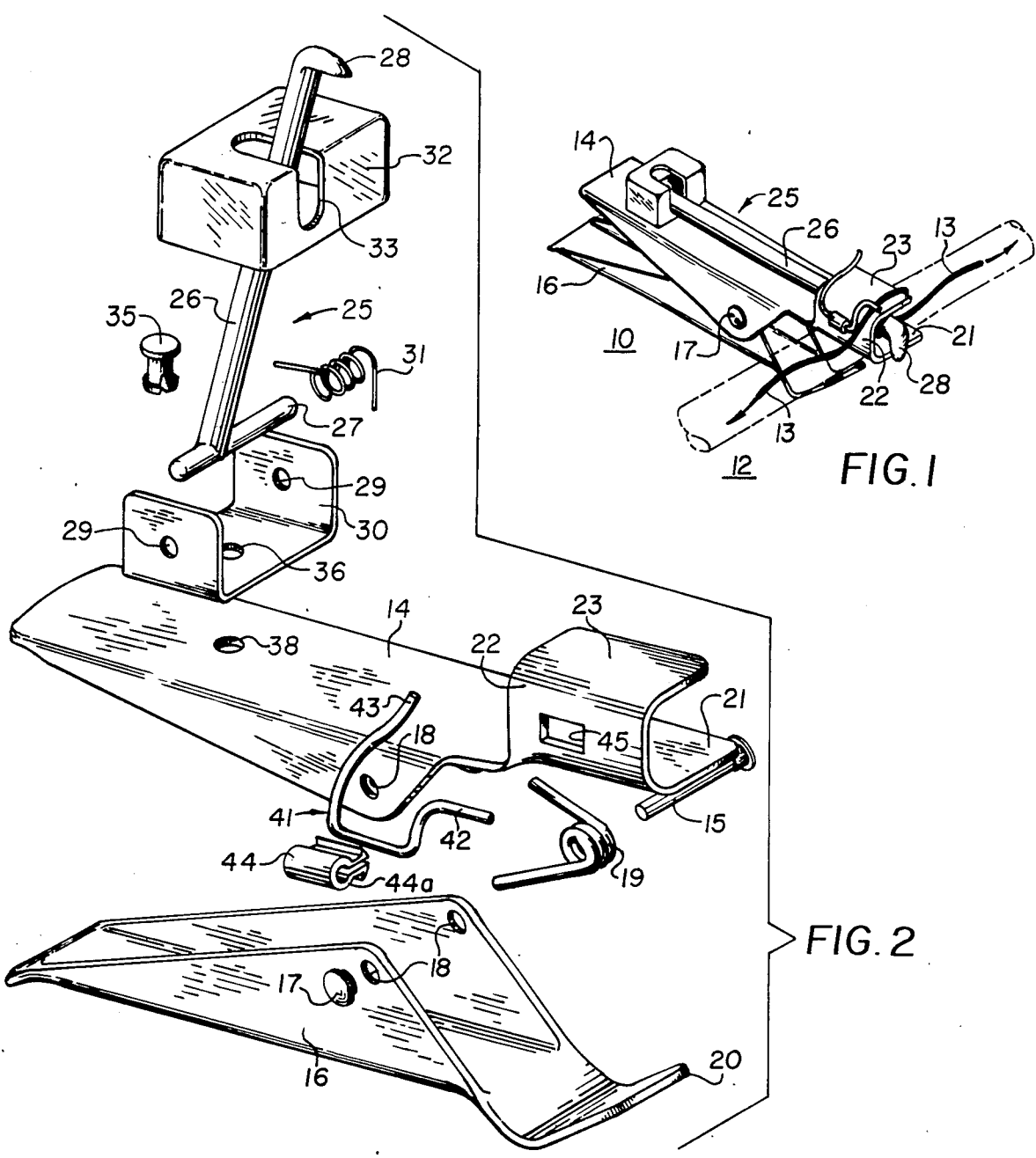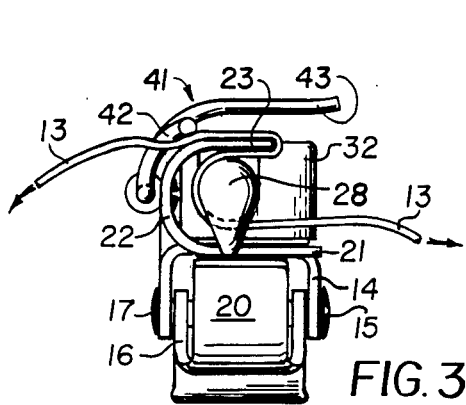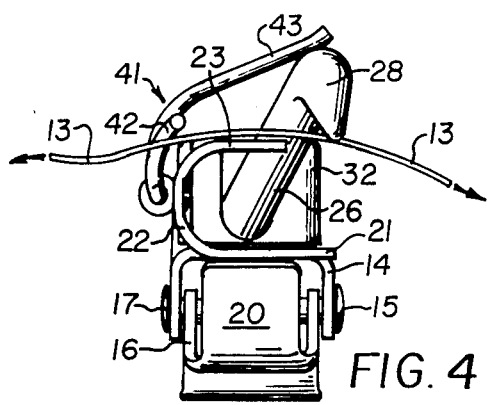

FISHING LINE STRIKE INDICATOR

BACKGROUND OF THE INVENTION

This invention relates to an improved fishing line strike indicator to be attached to a light duty fishing pole, and more particularly, to a spring-loaded pivotable indicator means which is set for activation by line disturbance.

FIELD OF THE INVENTION

The ability of the fisherman to recognize the presence of a fish feeding on the hooked bait when the location thereof is below water level and not visible to the fisherman requires the use of aids to help eliminate guesswork, and improve the percentages of fish caught. Hence, there is a recognized need for strike indicating devices to be used in the sport of fishing, and numerous devices have been no doubt devised and employed for this purpose. It is obvious that a definite and sometimes violent strike of a fish needs no aid in recognition, but in most instances the subtle feeding of the fish is difficult to detect, and there is almost an art involved in the knowledge of when to attempt to set the hook in the fish's mouth through a rearward pull of the line. The fisherman watches for a sign of the fish taking the bait as accompanied by a definite forward movement of the line, and at this time the hook can be best set.

Prior to the use of line movement detecting devices, the fisherman had to develop a keen eye and sense of slight movements of the line which were not caused by other factors than feeding fish, such as wind, water currents, waves, objects in the water, insects landing on the line, etc. A commonly used detecting device was the cork bobber or float which was attached to the line and rode the surface of the water, and could more easily be seen to become submerged when the line was taken out by a striking fish. It is the desire of the fisherman to set the hook in the fish's mouth at the very time the fish has secured a firm enough grip on the hook and bait to cause outward or forward movement of the fishing line.

In the practice of large game fishing or deep sea fishing, the practice of setting the hook is less of an art due to the more definite taking of the hooked bait by larger predator fish. A common method is to engage a braking device which halts line feed and thereby sets the hook. However, in light pole fishing such as fly fishing, the fisherman is in need of a light weight, simple and economical line strike indicator means which can be attached quite readily without tools during the act of fishing and can be removed just as easily if no longer desired to be used. The line strike indicator device of the present invention is comprised of simple clamping attachment means, a pivotable spring-biased strike signalling means which is activated by even slight forward line movements, and a secondary clamping means for securing the line against free movement and which will provide resistance to the line but without otherwise preventing line feed.

IN SUMMARY

It is an object of the present invention to provide a simple, economical and efficient line strike indicator device which may be easily and readily attached and removed from the fishing pole without otherwise interrupting the process of fishing. It is another object of the invention to provide a signalling device which can be readily set to its non-signalling position, and which is sufficiently sensitive to response to slight line disturbances (forward movement of the line) so as to be released for movement to its signalling position.

It is yet another object of the invention to provide a signalling device which is interfaced with the fishing line so as to sense forward movement of the line by being released thereby, and without becoming entangled in the line upon its release. It is still another object of the invention to provide separate line restraint means through secondary clamping means which acts to restrain the free movement of the line but which does not otherwise interfere with forward line movements caused by a fish taking the hooked bait.

It is a further object of the invention to provide that the released movement of the spring-loaded signalling device also acts to remove the secondary clamping means from its engagement with the line.

It is another object of the invention to provide a signalling device which employs only two moving parts to engage with the fishing line.

It is still a further object of the invention to provide a cost and size efficient fishing line strike indicator for use with light weight fishing poles, and particularly, to be used in the art of fly fishing.

An improved fishing line signalling device comprised in combination of: clamping means including in assembly a pair of elongated bar members pivotably connected off-center of and along their length dimensions, and being biased to move toward a stable clamped position of one end portion thereof, pivotable spring-biased signalling arm means mounted to one of the bar members and having a free-end portion thereof moving into engagement with the fishing line at a perpendicular angle thereto when moved to a non-signalling and set position thereof, and being moved by the fishing line from its set position thereof to a freed and signalling position thereof with forward movement of the fishing line, and secondary clamping means pivotably connected to the selected bar member to which the signalling arm means is connected and moveable from an open position in which the line is not engaged to a closed position in which the line is engaged to restrain the line against free movement while allowing forward movement of the fishing line, said secondary clamping means being moved from its closed position to its open position by engagement with the signalling arm means upon release of the signalling arm means responsive to forward line movements.

Other objects and advantages of this invention will become apparent from consideration of the following detailed description, wherein reference is made to the accompanying drawing disclosing a preferred embodiment of the present invention.

THE DRAWING

FIG. 1 is an assembled elevated perspective view of the present invention showing the fishing line strike indicator device in its mounted position clamped in attachment to a fishing pole, a segment shown in dashed lines.

FIG. 2 is an exploded perspective view of the strike indicator device of FIG. 1.

FIG. 3 is an elevated end view of the strike indicator device of the present invention, showing the particular method of line entrapment or engagement, and showing a secondary clamping device which engages the line for restraint thereof.

FIG. 4 is the elevated end view of FIG. 3, showing the released movement of the strike indicator signalling device and its effectiveness to remove the secondary line clamping device when released from its non-signalling set position.

DETAILED DESCRIPTION

There is shown in the accompanying drawing, and more particularly with immediate reference to FIGS. 1 and 2 thereof, an improved fishing line strike indicator means or device 10 which is attachable to a light duty fishing pole, a segment of which is shown at 12 in FIG. 1. The strike indicator device 10 is desirably clamped to the circumference of the fishing pole 12 by clothespin-like action, eliminating the need for use of tools to secure and unsecure the indicator device 10 from the pole 12. In this manner the fisherman may attach the indicator device 10 to the pole 12 during the act of fishing without otherwise disturbing the line or the act of fishing. The fishing line extends in a customary manner along the length of the fishing pole 12 and a segment thereof is shown at 13 in the drawings.

FIGS. 1 and 2 show both the assembly of the component parts comprising the strike indicator device 10, and the disassembly thereof, respectively. A pair of generally elongated bar members 14 and 16 are pivotably connected together about a pivot axis provided by pivot pin 15 and opposite end cap 17, which pivot pin 15 is intended to extend through axial openings 18 provided in both bar members 14 and 16, and is hereinafter referred to as pivot axis 18. The bar members 14 and 16 have their connection about pivot axis 18 off-center of their length dimension to provide a short side length dimension and a longer side length dimension, with the short side thereof providing the clamping end portion. Coil spring means 19 is employed between the bar members 14 and 16, usually oriented to comprise an upper bar member 14 and a lower bar member 16, and is captured to mount on the pivot pin 15 to provide bias to the bar members 14 and 16 to move together on the short side length dimension thereof, and to resist moving apart.

The lower bar member 16 includes an arcuate shaped end portion 20 on its free end of the short side dimension thereof. The end portion 20 first extends outwardly of its otherwise flat-like length dimension and then curves inwardly on an angle disposed approximately 90 degrees to the angle at which the end portion 20 was extending outwardly in order to provide for end portion 20 to encircle and grip the lower circumference of the pole 12 to which the strike indicator 10 is to be attached. A free end portion 21 of the upper bar member 14 is continued flat-like in its extension over the pole 12, but contains a widened width portion thereof providing a tine-like side extension which is arcuately formed in the shape of a U-bracket, including a leg portion 21, a base portion of the U-bracket 22 and an opposite leg portion 23. The leg portion 23 extends parallel with and over the leg portion 21 but is ended in its extension short of having the same width dimension as the width dimension of the leg portion 21. The U-shaped bracket as formed by parts 21, 22 and 23 provide holding means for holding the signalling arm means of the strike indicator device 10 in a non-signalling and set position as shall be more fully set forth hereinafter.

The assembly of parts shown at 25 in FIG. 2 comprise pivotable spring-biased signalling arm means including an elongated tine-like arm member 26 connected to a pivot pin 27 on an attachable end portion thereof, and including a tooth-like extension or shoulder 28 on its free end portion. The signalling arm means 26 comprises strike indicator means signalling the occurrence of forward line movements sufficient to have caused release of the biased signalling arm 26 from a non-signalling and set position. The signalling indicator arm 26 is attached by pin 27 being extended through axial openings 29 provided in a U-bracket 30. Coil spring means 31 is mounted on the pivot pin 27 in a suitable manner to provide the required bias to move the indicator arm 26 to a vertical or erect position indicative of the occurrence of forward line movements. The more erect position of the indicator arm 26 comprises a signalling or released position thereof. A cap member 32 is to be inserted over the U-bracket 30 and includes an elongated central opening 33 in its forward face and top surfaces through which the indicator arm 26 extends.

It is in accordance with the principle of the present invention that the U-bracket 30 is pivotably mounted to the upper bar member 14 for rotation about a vertical axis formed by a pivot pin 35 when inserted and captured through aligned openings 36 and 38. If desired to prevent excessive horizontal rotation about vertical axis 35, a mechanical stop (not shown) can be provided on the surface of the upper bar member 14 which will interfere with such rotation after a desired degree of rotation is achieved. It is required in achieving the release of the signalling arm 26 from beneath the upper leg portion 23, that the arm 26 be rotated about the vertical axis 35 to the extent required to release the upwardly biased arm 26 from interference with the leg portion 23. Thereupon, the signalling arm 26 will be forced by the coil spring means 31 to spring vertically to its freed and signalling position indicating forward line movement.

It can be readily seen from a consideration of FIGS. 3 and 4 of the drawing, that the line 13 is engaged during the act of setting of the signalling arm 26 to its non-signalling and set position, and is engaged by the arm 26 approximate to its free-end portion thereof. The shoulder extension 28 is useful to prevent the line 13 from slipping from beneath the arm 26 as the arm 26 moves downwardly over the line 13, and is placed beneath the upper leg portion 23 for engaging restraint thereby. During the loading or restraining movement of the signalling arm 26, the line 13 is caused to be extended over the upper leg portion 23 as shown in FIG. 4. The engaging action and movement of the arm 26 causes the line 13 to assume the partially looped, wrapped position shown in FIG. 3, wherein the line 13 is wrapped under the leg portion 23 and circumferentially of the arm 26 before extending along the length dimension of the fishing pole 12.

Also, in accordance with the principle of the present invention, the line 13 is restrained as it passes over the surface of the leg portion 23 by a pivotable wire-like clamping device 41 which includes a clamping end portion 42 and an opposite free end portion 43. The clamping device 41 is pivotably secured to the base wall portion 22 by insertion of attachment means 44 through a suitable opening 45 provided in the base wall portion 22. A suitable embodiment for the attachment means 44 takes the form of a clip means which compresses during insertion through the opening 45, and uses its spring bias to work against the compressed state to hold the clip 44 in the opening 45. The clip 44 is generally U-shaped and includes a cylindrical base portion 44a suitable to grasp and secure the cylindrical clamp 41. The clamp 41 pivots within the cylindrical base portion 44a for movement in a plane lying generally perpendicular to the plane in which the signalling arm 26 pivotably moves. The wire-like clamping device 41 comprises secondary clamping means wherein the primary clamping means is provided by the biased bar members 14 and 16.

In the setting operation for the signalling arm as described above, subsequent to having lodged the arm 26 beneath the upper leg portion 23 of the U-bracket provided by upper bar member 14, the wire-like clamping device 41 is rotated downwardly to a closed position so that the clamping end portion 42 engages and restrains the line 13 as it passes over the top surface of the leg portion 23. It is intended that the clamping device 41 not be provided with a strong bias toward its closed position so as to exert a sufficient force against the line 13 to deter forward movement or slippage of the line 13 as might be caused by the pulling of the line during the act of a fish taking the bait. The clamping device 41 is stable during any portion of its arc of rotation, if released. Hence, the clamp 41 will be stable in either the closed position, or in its fully open position, or at any point therebetween.

In the desired operation of the present invention, the pulling of the line 13 forwardly along the length of the pole 12 causes the line to be drawn against the drag of the fishing reel (not shown). This forward line movement straightens the partial loop of the line 13 provided by the setting of the arm 26, and causes the arm 26 to be moved firstly horizontally until the arm 26 is no longer engaged beneath the upper leg portion 23. Thereafter, the biased arm 26 moves in an arc about its pivot axis 27 to assume its more vertical position indicative of a "strike" on the fishing line 13.

The arm 26, upon its being released from engagement by the leg portion 23, operates to engage the free end portion 43 of the clamp device 41 in order to move the clamp device about its pivot axis provided by cylindrical portion 44a. The latter movement is operative to move the clamping end portion 42 off the line 13 in order to free the line 13 for "feeding-out" of the line 13 as is generally desired. The indication of line movement which is instantaneously provided by the released position of the arm 26, gives the fisherman the desired signal or indication to set the hook.

The operation of setting the arm 26 and setting the clamping device 41 can be expeditiously and efficiently done numerous times during a continuous period of fishing, with little or no disturbance to the line 13, and without awareness of the presence of feeding fish.

Other alternative and equally useful and/or equivalent configurations and embodiments could no doubt be thought of and/or utilized to accomplish the intent and purpose of the present invention. It is to be understood that while the present invention has been shown and described with reference to the preferred embodiments thereof, the invention is not so limited to the precise forms and configurations set forth, and that some modifications and changes may be made therein departing from the true spirit and scope of the present invention.

What is claimed is:

1. An improved fishing line signalling device providing strike indication, comprising in combination: clamping means including in assembly a pair of elongated bar members pivotably connected off-center of and along the length dimensions thereof, and being biased to move together along an aligned end portion thereof to provide a clamping end portion for attachment of the signalling device, pivotable spring-biased signalling arm means to be pivotably connected to a selected bar member for movement about a vertical axis to provide horizontal displacement of the signalling arm means, and to be pivotably connected for movement about a horizontal axis to provide vertical displacement of the signalling arm means in the direction of the spring-bias, the spring-bias moving the signalling arm means responsive thereto to a released signalling position thereof, said signalling arm means having a free-end portion thereof movable against said spring-bias and into engagement with a perpendicularly extended fishing line with movement thereof to a set non-signalling position thereof, and having the free-end portion thereof movable horizontally by the engaging fishing line about the vertical axis of the signalling arm means with forward line movements of the fishing line, to provide release of the signalling arm means to the released signalling position thereof, and secondary clamping means movable into engagement with the fishing line for providing restraint against free line movement while allowing forward line movement thereof, and being moved by the signalling arm means from engagement with the fishing line with movement of the signalling arm means to the released signalling position thereof.

2. An improved fishing line signalling device providing strike indication, comprising in combination: clamping means including in assembly a pair of elongated bar members pivotably connected off-center of and along the length dimensions thereof, and being biased to move together along an aligned end portion thereof to provide a clamped position thereof, pivotable spring-biased signalling arm means to be connected to a selected one of the bar members and having a free-end portion thereof movable against said spring-bias into engagement with a perpendicularly disposed fishing line with movement of the signalling arm to a set non-signalling position thereof, and being moved by the fishing line from the set position to a released erect signalling position with forward movement of the engaged fishing line, said signalling arm means being pivotably connected for movement about a vertical axis to provide a vector of horizontal movement for the signalling arm means responsive to forward line movements, and is pivotably connected for movement about a horizontal axis to provide a vector of vertical movement for the signalling arm means, moving the signalling arm means responsive to the biasing force to a freed erect signalling position thereof, and secondary clamping means pivotably connected to a selected bar member and movable from an open non-engaging position to a closed engaging position in which the fishing line is engaged for providing restraint against free line movement while allowing forward line movement thereof, the secondary clamping means being released from said line restraint by engagement of the signalling arm means during movement thereof to the released erect position responsive to forward line movements.

3. An improved fishing line signalling device as claimed in claim 1 wherein the secondary clamping means includes one end portion thereof movable into restraining engagement with the fishing line while allowing forward movements thereof, and another end portion thereof movable into an interfering position with the vertical movement of the signalling arm means whereby the signalling arm means engages the interferingly positioned end portion thereof and moves the secondary clamping means to the open non-engaging position thereof.

4. An improved fishing line signalling device as claimed in claim 2 wherein the signalling arm means includes shoulder extension means on its free end portion thereof to provide restraint against lateral movement of the fishing line with setting movement of the signalling arm means.

5. An improved fishing line signalling device as claimed in claim 2 wherein the end portions of the elongated bar members which are biased to move together to a clamped position thereof are compressed to move apart under bias and clampingly attached around the circumferential dimension of the fishing pole, with a selected end portion thereof aligned to engage the signalling arm means in the restrained set non-signalling position thereof, and to engage the fishing line together with the secondary clamping means with the one end portion of the secondary clamping means moved into restraining engagement with the fishing line.

* * * * *